Sept. 8, 1931.  E. RICARD ET AL  1,822,454
PROCESS AND APPARATUS FOR THE SIMULTANEOUS DISTILLATION, PURIFYING, AND DEHYDRATION OF ALCOHOL OBTAINED FROM FERMENTED MASH
Filed April 16, 1928
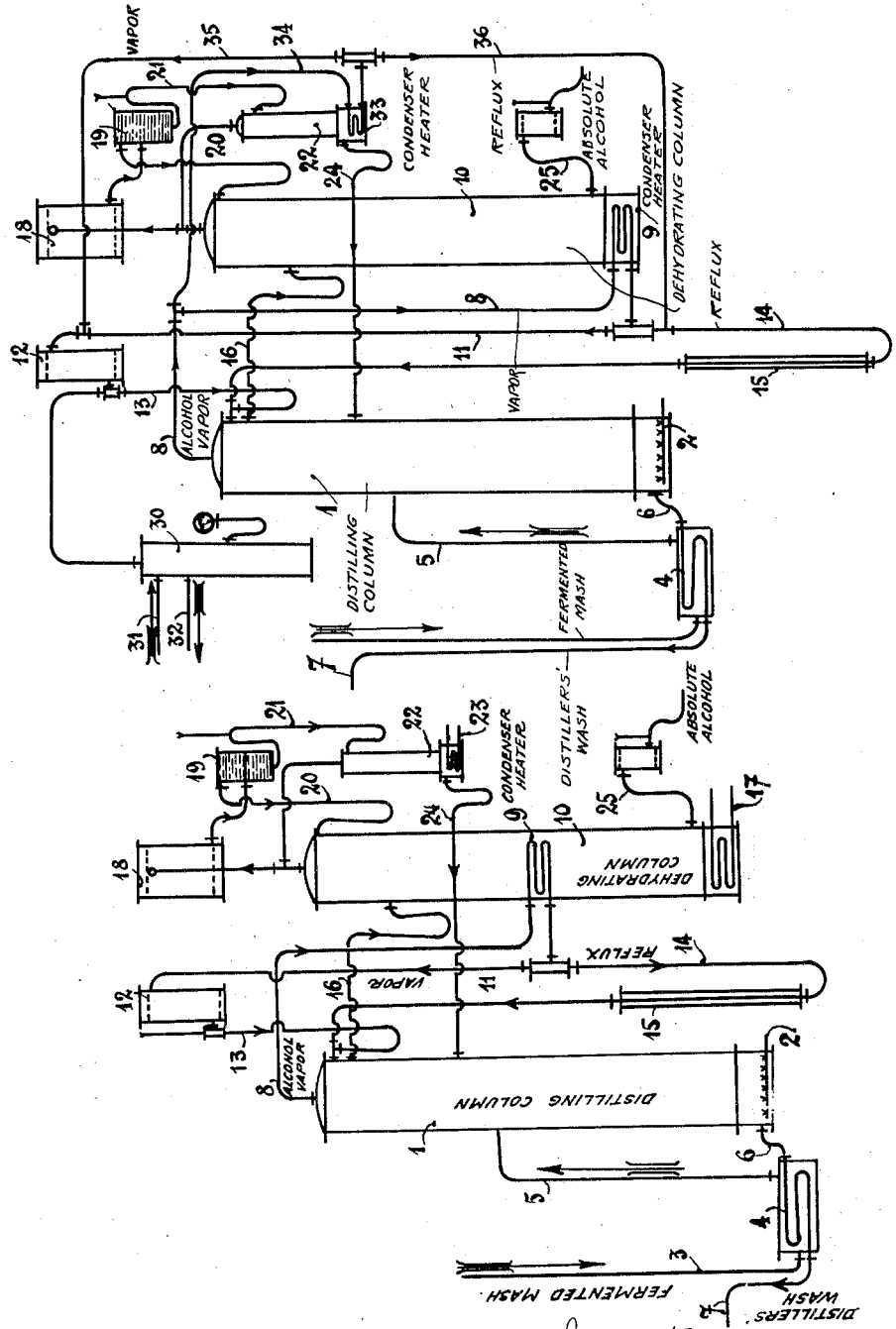

Patented Sept. 8, 1931

1,822,454

UNITED STATES PATENT OFFICE

ELOI RICARD, PAUL SAVARIT, AND HENRI MARTIN GUINOT, OF MELLE, FRANCE, ASSIGNORS, BY MESNE ASSIGNMENTS, TO U. S. INDUSTRIAL ALCOHOL CO., OF NEW YORK, N. Y., A CORPORATION OF WEST VIRGINIA

PROCESS AND APPARATUS FOR THE SIMULTANEOUS DISTILLATION, PURIFYING, AND DEHYDRATION OF ALCOHOL OBTAINED FROM FERMENTED MASH

Application filed April 16, 1928, Serial No. 270,337, and in France April 21, 1927.

The industrial manufacture of absolute alcohol, based upon the use of fermented mash (from molasses, beets, potatoes, or cereals) commonly requires three distinct operations, as follows.

A.—The mash is distilled by means of distilling apparatus of the upright cylindrical type, or towers, which produce raw alcohol or phlegm of low grade (50–75 per cent) or of high grade (80–92 per cent).

B.—The raw alcohol is rectified by the use of rectifying apparatus of the upright type, either intermittent or continuous, which permit to concentrate and to purify the alcohol and to obtain per hectoliter of alcohol treated, 80 per cent of technically pure alcohol, termed rectified alcohol, of about 96 degrees Gay-Lussac, as well as 20 per cent of an alcohol of bad-savour containing the impurities.

C.—The said rectified alcohol is dehydrated by means of rectifying apparatus, by the azeotropic method.

The consumption of steam for the first operation (A) will vary with the nature of the fermented mash. We will give some definitive data as to this consumption by taking as an example a molasses mash containing 7 per cent of alcohol.

The distillation according to (A) requires about 300 kgs. of steam per hectoliter of raw alcohol counted at 100 degrees strength; the rectifying process (B) consumes about 300 kgs. of steam per hectoliter of alcohol treated, but since we obtain only 80 per cent of rectified alcohol adapted for the dehydration treatment, it will follow that the consumption, counted on the basis of a hectoliter of rectified alcohol, is $$\frac{300 \times 100}{80} = 375 \text{ kgs.};$$

the dehydration process (C) requires about 200 kgs. of steam per hectoliter of alcohol. The total consumption of steam is therefore 875 kgs. per hectoliter of absolute alcohol obtained.

A certain progress has already been made in order to reduce the consumption of steam, and this progress may be specified as follows.

D.—The operations (A) and (B) can be combined in a single operation, by the use of distilling and rectifying apparatus having a direct action, which at once produce alcohol which is technically purified to the extent of 80 per cent, and also an alcohol of bad savour containing the impurities in the proportion of 20 per cent. The consumption of steam for the direct distilling and rectifying, is about 400 kgs. per hectoliter, (it being also variable according to the system in use). On the basis of a hectoliter of rectified alcohol, this represents a consumption of $$\frac{400 \times 100}{80} = 500 \text{ kgs.}$$

per hectoliter. Since the subsequent dehydration requires 200 kgs. of steam, the total consumption per hectoliter of absolute alcohol is 700 kgs.

E.—Within a recent date, means have been found for the direct dehydration of high grade raw alcohol (95–95.5 degrees) this being purified at the same time. The total operation requires 250 kgs. of steam per hectoliter of the alcohol treated and since this operation affords 95 per cent of dehydrated alcohol in the purified state, the amount of steam on the basis of a hectoliter of alcohol is $$\frac{250 \times 100}{95} = 265 \text{ kgs.}$$

The distillation at a very high degree (95–95.5 degrees) does not require any more steam than the distillation simply at a high degree (80–92 degrees) so that finally the consumption of steam per hectoliter of dehydrated alcohol is 615 kgs.

We have ascertained that the amount of steam for the dehydration of alcohol could be further reduced, and we have devised the process and apparatus, the subject-matter of the present invention. For the direct dehydration of alcohol starting from a 7 per cent molasses mash, the consumption of steam is about 350 kgs.

This great reduction in steam consumption is accomplished by connecting the high-degree distilling apparatus with the dehydrating apparatus, by heating the fermented mash before distillation solely by means of the boiling distillers' wash discharged from the apparatus, and by the use of the high-degree alcohol vapour for indirect heating of the dehydrating apparatus by causing the vapor to relinquish sensible and latent heat in a coil in said apparatus.

It is in fact observed that in an upright distilling apparatus or tower operating at a high degree, the temperature of the alcohol vapour issuing at the top is 78 degrees centigrade, and the temperature of the wash discharged at the bottom is 105 degrees; but in an upright dehydrating apparatus employing the azeotropic method, the temperature at the top is 60–65 degrees according to the character of the entraining body, and the temperature at the bottom is 81 degrees. For this reason there will be a certain portion of the dehydrating apparatus (about ¾ in which the temperature is below 78 degrees, and this part may be heated by alcohol vapour issuing from the distilling apparatus. The same is true for the first accessory apparatus used with the dehydrating apparatus.

If the dehydrating apparatus is to be heated in all its parts and not only partially, by means of the alcohol vapour from the distilling apparatus, it is simply necessary to increase the temperature of the said vapour by operating the distilling apparatus at a slight pressure. Thus for example if the upper part of the distilling apparatus is maintained at a pressure of 5 meters of water, the temperature of the alcohol vapour will be raised to 89 degrees C., and if maintained at 10 meters of water, the temperature of the alcohol vapour will be raised to 97 degrees.

The following description with reference to the appended drawings which are given by way of example shows the operation of the said apparatus, which may be effected according to the two arrangements shown in Figures 1 and 2.

In these drawings:

Fig. 1 is a diagrammatic representation of apparatus for carrying out the process; and Fig. 2 is a diagrammatic representation of a similar apparatus with additional features.

First example (Fig. 1).

The cylindrical distilling apparatus 1 is heated by steam at 2. The fermented mash to be distilled is supplied through the pipe 3 and it becomes heated to 90° C. in contact with the distillers' wash in a substantial heat-exchanging device 4, passing thence through the pipe 5 into the apparatus 1. The said wash is discharged from the bottom of the distilling apparatus through the pipe 6; it is cooled in the said heat-exchanging apparatus, thus heating the wort to be distilled, and issues through the pipe 7.

The alcohol vapour issues from the top of the distilling apparatus 1 through the pipe 8, passing thence into the evaporating and condensing device 9 which heats the distilling apparatus 10; the uncondensed vapour rises through the pipe 11 into the condenser 12, and the condensed liquid therefrom will return through the pipe 13 into the distilling apparatus 1. The upper part of the pipe 13 is open to the air.

The alcoholic liquid obtained from the vapour condensed in 9 descends through the pipe 14 and must be elevated to the top of the distilling apparatus 1; this can be done by means of a pump, or by an emulsion apparatus 15, or the like. The distilling apparatus 10 is supplied with alcohol to be dehydrated which is obtained from the apparatus 1 by means of the pipe 16. The extra heating, if any, of apparatus 10 is effected by the steam pipe 17.

In this column the alcohol is subjected to azeotropic distillation in the presence of a suitable water entrainer, such as benzol for example, with which this column is charged.

The azeotropic mixture is distilled at the top of the apparatus 10; it condenses in the condenser 18 and is circulated into the decanting apparatus 19 in which the liquid is separated into two layers. Each layer contains the three substances, water, ethyl alcohol and the entraining liquid. The upper layer contains the major part of the entraining liquid and very little water, whereas the bottom layer contains almost all the water. The upper layer returns through the pipe 20 into the upper part of the apparatus 10; the bottom layer is circulated through the pipe 21 into the top of the small apparatus 22. This latter is heated by the steam pipe 23, and the liquid which issues at the bottom of the said small apparatus, which consists exclusively of alcohol and water, returns through the pipe 24 into the apparatus 1. The absolute alcohol is discharged from the apparatus 10 through the pipe 25.

The impurities are removed from the dehydrated alcohol by the known means, and by the use of accessory apparatus which need not be described. For an illustration of such means, reference may be had to the Ricard Patent 1,763,722, dated June 17, 1930.

Second example (Figure 2).

The arrangement resembles the preceding, but the distilling apparatus 1 operates at a pressure of 5 meters of water at the top, so that the alcohol vapour will become heated to 89° C. The pipe 13 has no atmospheric connection, but is connected with a closed vessel 30 into which air can be sent through the pipe 31, or from which air may be withdrawn through the pipe 32, so as to obtain the desired constant pressure. The dehydrating apparatus 10 and the small apparatus 22 are steam heated at the bottom by means of the condensing and evaporating apparatus 9 and 33, which are supplied with alcohol vapour from the top of the distilling apparatus through the pipes 8 and 34.

The uncondensed vapours are sent into the condenser 12 through the pipes 11 and 35, and the alcohol from the condensed alcohol vapours descends through the pipes 14 and 36 and is elevated to the top of apparatus 1 by the emulsion apparatus 15 or by like means.

In these arrangements, it will be observed that the whole of the heat contained in the alcohol vapours from the distilling apparatus serves to heat the dehydrating apparatus without other expenditure, and this explains why the total consumption for the operation is as low as 350 kgs.

Otherwise, the process and apparatus of the example illustrated in Fig. 2 are the same as the process and apparatus of the example illustrated in Fig. 1, and as the same parts bear the same reference numerals in both views it will be unnecessary to repeat the description of these parts in connection with Fig. 2.

What we claim is:—

1. A continuous process for the manufacture of absolute alcohol from dilute aqueous alcohol, which comprises distilling the dilute aqueous alcohol in one apparatus, and dehydrating the alcohol thus obtained in another apparatus, and heating the dehydration apparatus by circulating alcoholic vapors from the first distilling apparatus so that they condense in indirect heat-exchange relation with the contents of the dehydrating apparatus and return to the first distilling apparatus.

2. A process as set forth in claim 1, further characterized in that the temperature of the alcoholic vapors thus employed for heating the dehydrating apparatus is increased by conducting the distillation of the dilute aqueous alcohol under pressure.

3. A process as set forth in claim 1, further characterized in that the temperature of the alcoholic vapors thus employed for heating the dehydrating apparatus is sufficiently increased by conducting the distillation of the dilute aqueous alcohol under pressure so that no additional heating of the dehydrating apparatus is required.

4. A continuous process for the manufacture of absolute alcohol from fermented mashes containing aqueous alcohol, which comprises distilling said mashes in one apparatus, and dehydrating the alcohol thus obtained in another apparatus, and heating the dehydration apparatus by circulating alcoholic vapors from the mash-distilling apparatus so that they condense in indirect heat-exchange relation with the contents of the dehydrating apparatus and return to the mash-distilling apparatus.

5. A continuous process for the manufacture of absolute alcohol from dilute aqueous alcohol, which comprises distilling said dilute aqueous alcohol in one apparatus, heating the said dilute aqueous alcohol before it enters this distilling apparatus by means of the boiling distiller's wash discharged at the bottom of said apparatus, dehydrating the raw alcohol in another apparatus, and heating the dehydration apparatus by circulating alcoholic vapors from the first distilling apparatus so that they condense in indirect heat-exchange relation with the contents of the dehydration apparatus and return to the first distilling apparatus.

6. A continuous process for the manufacture of absolute alcohol from fermented mashes containing aqueous alcohol, which comprises distilling said mashes in one apparatus, heating the said mashes before they enter this distilling apparatus by means of the boiling distiller's wash discharged at the bottom of said apparatus, dehydrating the raw alcohol in another apparatus, and heating the dehydration apparatus by circulating alcoholic vapors from the mash-distilling apparatus so that they condense in indirect heat-exchange relation with the contents of the dehydration apparatus and return to the mash-distilling apparatus.

7. Apparatus for the manufacture of absolute alcohol from dilute aqueous alcohol, comprising a column still for obtaining raw alcohol, means for supplying the dilute aqueous alcohol thereto, a second column still for dehydrating the raw alcohol, means for conducting the raw alcohol to the dehydrating column, a condensing and heating coil in the dehydrating column, means for conducting alcoholic vapors from the first distilling column to said coil to heat the dehydrating column, and means for returning the alcoholic material to the first distilling column after it has relinquished sensible and latent heat in said coil.

8. Apparatus for the manufacture of absolute alcohol from dilute aqueous alcohol, comprising a column still for obtaining raw alcohol, means for supplying the dilute aqueous alcohol thereto, a second column still for dehydrating the raw alcohol, means for conducting the raw alcohol to the dehydrating column, a condensing and heating coil in the dehydrating column, means for conducting alcoholic vapors from the first distilling column to said coil to heat the dehydrating column, means for returning condensate from said coil to the first distilling column, a condenser, means for conducting to said condenser alcoholic vapors which do not condense in the coil in the dehydrating column, and means for returning the condensate from said condenser to the first distilling column.

9. Apparatus for the manufacture of absolute alcohol from dilute aqueous alcohol, comprising a column still for obtaining raw alcohol, means for supplying the dilute aqueous alcohol thereto, means for heating the dilute aqueous alcohol before it enters this column by the distiller's wash discharged at the bottom of the column, a second column still for dehydrating the raw alcohol, means for conducting the raw alcohol to the dehydrating column, a condensing and heating coil in the dehydrating column, means for conducting alcoholic vapors from the first distilling column to said coil to heat the dehydrating column, and means for returning the alcoholic material to the first distilling column after it has relinquished sensible and latent heat in said coil.

10. Apparatus for the manufacture of absolute alcohol from dilute aqueous alcohol, comprising a column still for obtaining raw alcohol, means for supplying the dilute aqueous alcohol thereto, a second column still for dehydrating the raw alcohol, means for conducting the raw alcohol to the dehydrating column, a condensing and heating coil in the dehydrating column, means for condensing the vapors issuing from the dehydrating column and for allowing the condensate to separate into layers, an auxiliary column still to which the liquid of one of these layers is conducted, a condensing and heating coil in this column, and means for conducting alcoholic vapors from the first distilling column to said coils to heat both the dehydrating column and the auxiliary column, and means for returning the alcoholic material to the first distilling column after it has relinquished sensible and latent heat in said coils.

In testimony whereof we have signed this specification.

ELOI RICARD.
PAUL SAVARIT.
HENRI MARTIN GUINOT.